US 7,325,079 B2

(12) United States Patent
Sato

(10) Patent No.: US 7,325,079 B2
(45) Date of Patent: Jan. 29, 2008

(54) INFORMATION TERMINAL, INFORMATION PROCESSING SYSTEM, AND METHODS OF CONTROLLING THE SAME

(75) Inventor: Jun Sato, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 465 days.

(21) Appl. No.: 11/092,987

(22) Filed: Mar. 30, 2005

(65) Prior Publication Data
US 2005/0235082 A1   Oct. 20, 2005

(30) Foreign Application Priority Data
Mar. 30, 2004  (JP) ............... 2004-098596
Feb. 4, 2005   (JP) ............... 2005-028593

(51) Int. Cl.
G06F 3/00   (2006.01)
G06F 13/20  (2006.01)
(52) U.S. Cl. .................. 710/20; 710/7; 710/29; 710/40; 710/313
(58) Field of Classification Search ........... 710/1–7, 710/20–21, 29, 36–40, 52–60, 305–313
See application file for complete search history.

(56) References Cited

U.S. PATENT DOCUMENTS 6,816,929 B2 * 11/2004 Ueda ................... 710/56

7,124,280 B2 * 10/2006 Kamitani et al. ........... 712/26
2003/0061408 A1   3/2003 Kenichiro
2004/0068590 A1 *  4/2004 Nishino et al. .......... 710/52
2004/0174442 A1 *  9/2004 Chosa ................ 348/231.1
2006/0085577 A1 *  4/2006 Takashima et al. ........ 710/62
2006/0277339 A1 * 12/2006 Sakaki et al. ............ 710/62
2006/0294306 A1 * 12/2006 Hong .................. 711/115

FOREIGN PATENT DOCUMENTS

JP           2003-99207 A       4/2003

* cited by examiner

Primary Examiner—Christoher Shin
(74) Attorney, Agent, or Firm—Sughrue Mion, PLLC

(57) ABSTRACT

An information terminal disclosed herein includes a data storage in which data is stored; an internal controller which accesses the data storage by a request from inside the information terminal; and an external controller which accesses the data storage by a request from outside the information terminal. If a request that the internal controller access the data storage is generated while the external controller is accessing the data storage, then the external controller repeatedly transmits a negative reply that data has not been properly received in response to access from the outside and the internal controller accesses the data storage while the external controller repeatedly transmits the negative reply.

12 Claims, 18 Drawing Sheets

INFORMATION TERMINAL, INFORMATION PROCESSING SYSTEM, AND METHODS OF CONTROLLING THE SAME

CROSS REFERENCE TO RELATED APPLICATION

This application claims benefit of priority under 35 U.S.C.§119 to Japanese Patent Applications No. 2004-98596, filed on Mar. 30, 2004, and No. 2005-28593, filed on Feb. 4, 2005, the entire contents of which are incorporated by reference herein.

BACKGROUND OF THE INVENTION

1. Field of the Invention

The present invention relates to an information terminal, an information processing system, and methods of controlling the same.

2. Related Background Art

As small-sized information terminals each equipped with a hard disk drive, there are a still image reproducing apparatus, a moving image reproducing apparatus, and a music reproducing apparatus. In some cases, such a small-sized information terminal as a mass storage class device is connected to a personal computer as a host terminal by USB (Universal Serial Bus) 2.0. When being connected by USB, a hard disk drive on the information terminal side is controlled by the personal computer as a host side.

When the hard disk drive of the information terminal is controlled by the host side as just described, it is very difficult that a CPU itself of the information terminal accesses to this hard disk drive since a malfunction occurs in terms of a system. Therefore, while data is being transferred from the host terminal to the hard disk drive of the information terminal, the CPU of the information terminal cannot access the hard disk drive. Accordingly, for example, while data is being transferred from the host terminal to the hard disk drive in the information terminal, neither still images, nor moving images, nor music files can be reproduced on the information terminal side.

According to Japanese Patent Application Laid-open No. 2003-99207 (Patent Document 1), even while data is being transferred from the personal computer as the host terminal to the hard disk drive of the information terminal, the data transmitted from the host terminal can be immediately confirmed in the information terminal, but this is nothing more than a situation where the data transmitted from the host terminal to the information terminal is outputted as it is to an output unit. Hence, this does not mean that access to data stored in the hard disk drive is positively accepted while a large amount of data is being transferred from the host terminal to the information terminal.

However, recently, the number of pixels of a still image or a moving image is increasing, and the size of data transferred from the personal computer as the host terminal to the information terminal is also increasing. Therefore, if the CPU of the information terminal can access the hard disk drive even during data transfer, it becomes possible to confirm the contents of already-transferred data and delete data, which is convenient for users.

SUMMARY OF THE INVENTION

Hence, the present invention is made in view of the aforementioned problems, and it is an object of the present invention that even while a host terminal is accessing a hard disk drive of an information terminal, the information terminal itself can perform an interrupt to access the hard disk drive.

In order to accomplish the aforementioned and other objects, according to one aspect of the present invention, an information terminal comprises:

a data storage in which data is stored;

an internal controller which accesses the data storage by a request from inside the information terminal; and an external controller which accesses the data storage by a request from outside the information terminal, wherein, if a request that the internal controller access the data storage is generated while the external controller is accessing the data storage, then the external controller repeatedly transmits a negative reply that data has not been properly received in response to access from the outside and the internal controller accesses the data storage while the external controller repeatedly transmits the negative reply.

According to another aspect of the present invention, a control method of an information terminal including a data storage in which data is stored, an internal controller which accesses the data storage by a request from inside the information terminal, and an external controller which accesses the data storage by a request from outside the information terminal comprises the steps of:

when a request that the internal controller access the data storage is generated while the external controller is accessing the data storage, repeatedly transmitting, from the external controller, a negative reply that data has not been properly received in response to access from the outside, and allowing the internal controller to access the data storage while the negative reply is repeatedly transmitted.

According to another aspect of the present invention, an information processing system includes an information terminal and a host terminal connected to the information terminal, wherein the information terminal comprises:

a data storage in which data is stored;

an internal controller which accesses the data storage by a request from inside the information terminal; and an external controller which accesses the data storage by a request from outside the information terminal, and if a request that the internal controller access the data storage is generated while the external controller is accessing the data storage, then the external controller repeatedly transmits a negative reply that data has not been properly received in response to access from the outside and the host terminal which has received the negative reply repeatedly transmits the same data, and the internal controller accesses the data storage while the external controller repeatedly transmits the negative reply.

According to another aspect of the present invention, a control method of an information processing system includes an information terminal and a host terminal connected to the information terminal, wherein the information terminal comprises:

a data storage in which data is stored an internal controller which accesses the data storage by a request from inside the information terminal; and an external controller which accesses the data storage by a request from outside the information terminal, and the control method comprises the steps of:

when a request that the internal controller access the data storage is generated while the external controller is accessing the data storage, repeatedly transmitting, from the external controller, a negative reply that data has not been properly received in response to access from the outside, making the host terminal which has received the negative reply to repeatedly transmit the same data, and allowing the internal controller to access the data storage while the negative reply is repeatedly transmitted.

DETAILED DESCRIPTION OF THE EMBODIMENTS

First Embodiment

In this embodiment, in a small-sized information terminal equipped with a hard disk drive, the information terminal itself can access the hard disk drive even while data is being exchanged between a host terminal and the hard disk drive via USB. Further details will be given below.

Figure 1:
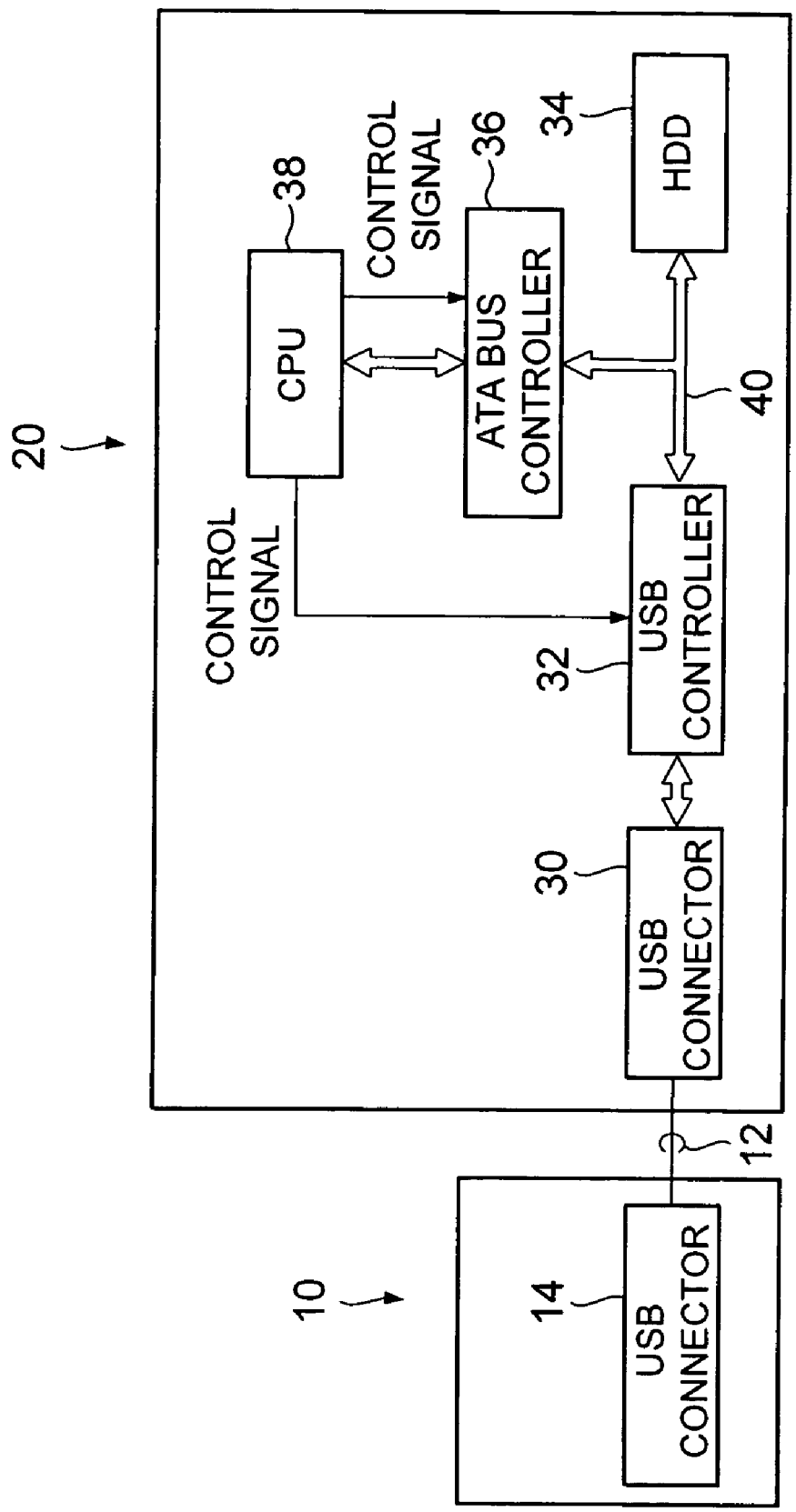
FIG. 1 is a block diagram showing an example of the configuration of an information processing system according to a first embodiment of the present invention.

FIG. 1 is a block diagram showing the configuration of an information processing system according to this embodiment. As shown in FIG. 1, the information processing system according to this embodiment includes a personal computer 10 as a host terminal and an information terminal 20 connected to this personal computer 10.

The personal computer 10 and the information terminal 20 are connected by a USB cable 12. Namely, a USB connector 14 provided on one end side of the USB cable 12 is connected to the personal computer 10, and a USB connector 30 provided on the other end side of the USB cable 12 is connected to the information terminal 12. Incidentally, the personal computer 10 and the information terminal 20 are connected based on the standard specification of USB 2.0 in this embodiment, but they may be connected based on the standard specification of USB 1.1.

The information terminal 20 includes therein a USB controller 32, a hard disk drive 34, an ATA bus controller 36, and a CPU (Central Processing Unit) 38.

The USB controller 32 controls communication with the personal computer 10. For example, the USB controller 32 transmits an ACK (acknowledge) packet when having properly received a data packet from the personal computer 10, and transmits a NAK (negative acknowledge) packet when not having properly received the data packet. The personal computer 10 which has received the ACK packet transmits the next packet, but it transmits the same packet again when having received the NAK packet. Data which has been properly received by the USB controller 32 is transmitted to the hard disk drive 34 via a hard disk drive connection bus 40 and stored in the hard disk drive 34.

In contrast, when data read from the hard disk drive 34 is transmitted to the personal computer 10, the USB controller 32 transmits a data packet which includes the data read from the hard disk drive 34 to the personal computer 10. When the personal computer 10 has properly received the data packet, the ACK packet is transmitted to the USB controller 32, and when the personal computer 10 has not properly received the data packet, the NAK packet is transmitted to the USB controller 32.

The ATA bus controller 36 is also connected to the hard disk drive connection bus 40. The ATA bus controller 36 is provided between the CPU 38 and the hard disk drive 34 and mediates data exchange between them.

Figure 2:
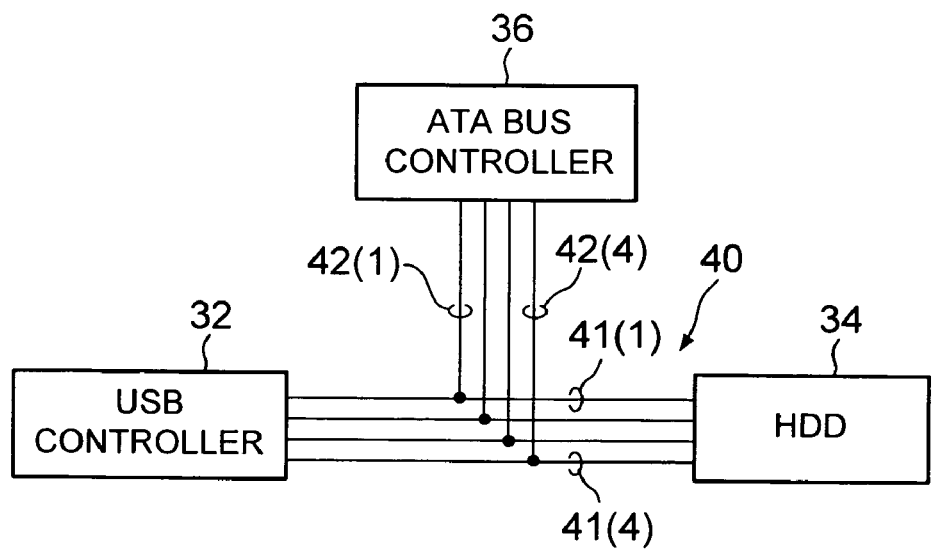
FIG. 2 is a diagram showing an example of the configuration of a hard disk drive connection bus according to the first embodiment.

FIG. 2 is a diagram showing a physical connection relationship of the hard disk drive connection bus 40. As shown in FIG. 2, the hard disk drive connection bus 40 is composed of plural connecting wires. More specifically, a connecting wire 41(1) which connects the USB controller 32 and the hard disk drive 34 is electrically connected with a connecting wire 42(1) to the ATA bus controller 36. Similarly, a connecting wire 41(4) which connects the USB controller 32 and the hard disk drive 34 is electrically connected with a connecting wire 42(4) to the ATA bus controller 36. Namely, the connection wires 40 among the USB controller 32, the hard disk drive 34, and the ATA bust controller 36 are electrically connected in a one-to-one correspondence with each other.

When the ATA bus controller 36 is electrically disconnected from the hard disk drive connection bus 40, the connection of the ATA bus controller 36 to the hard disk drive connection bus 40 is set to high impedance. When the USB controller 32 is electrically disconnected from the hard disk drive connection bus 40, the connection of the USB controller 32 to the hard disk drive connection bus 40 is set to high impedance.

Figure 3:
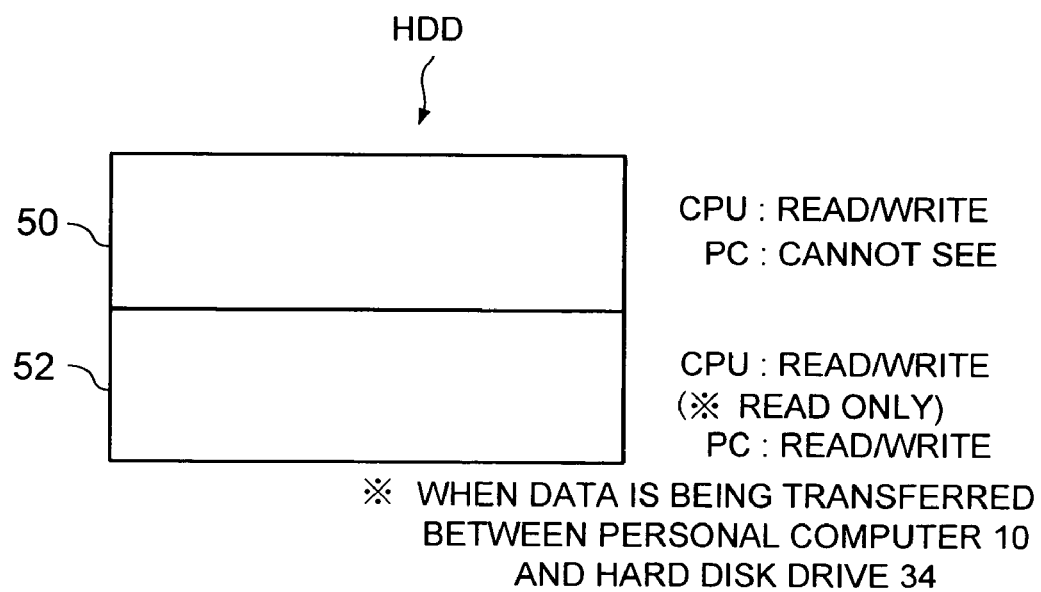
FIG. 3 is a diagram showing an example of the configuration of a hard disk drive according to the first embodiment.

FIG. 3 is a diagram showing areas of the hard disk drive 34 according to this embodiment. As shown in FIG. 3, in this embodiment, the hard disk drive 34 is partitioned into two areas: a first area 50 and a second area 52. The first area 50 can be seen by the CPU 38 of the information terminal 20 but cannot be seen by the personal computer 10. The second area 52 can be seen both by the CPU 38 of the information terminal 20 and by the personal computer 10.

In this embodiment, even while the personal computer 10 is writing or reading data to or from the hard disk drive 34, the CPU 38 can temporarily suspend this access and access the hard disk drive 34. While data is being exchanged between the personal computer 10 and the hard disk drive 34, the CPU 38 is set to be able to both read/write data from/to the first area 50, and to be able to read data but unable to write data from/to the second area 52. The personal computer 10 can both read/write data from/to the second area 52. It is needless to say that while data is not being exchanged between the personal computer 10 and the hard disk drive 34, the CPU 38 can read/write data from/to both the first area 50 and the second area 52. It is noted, however, that even while data is not being exchanged, the first area 50 remains an area which cannot be seen by the personal computer 10.

Figure 4:
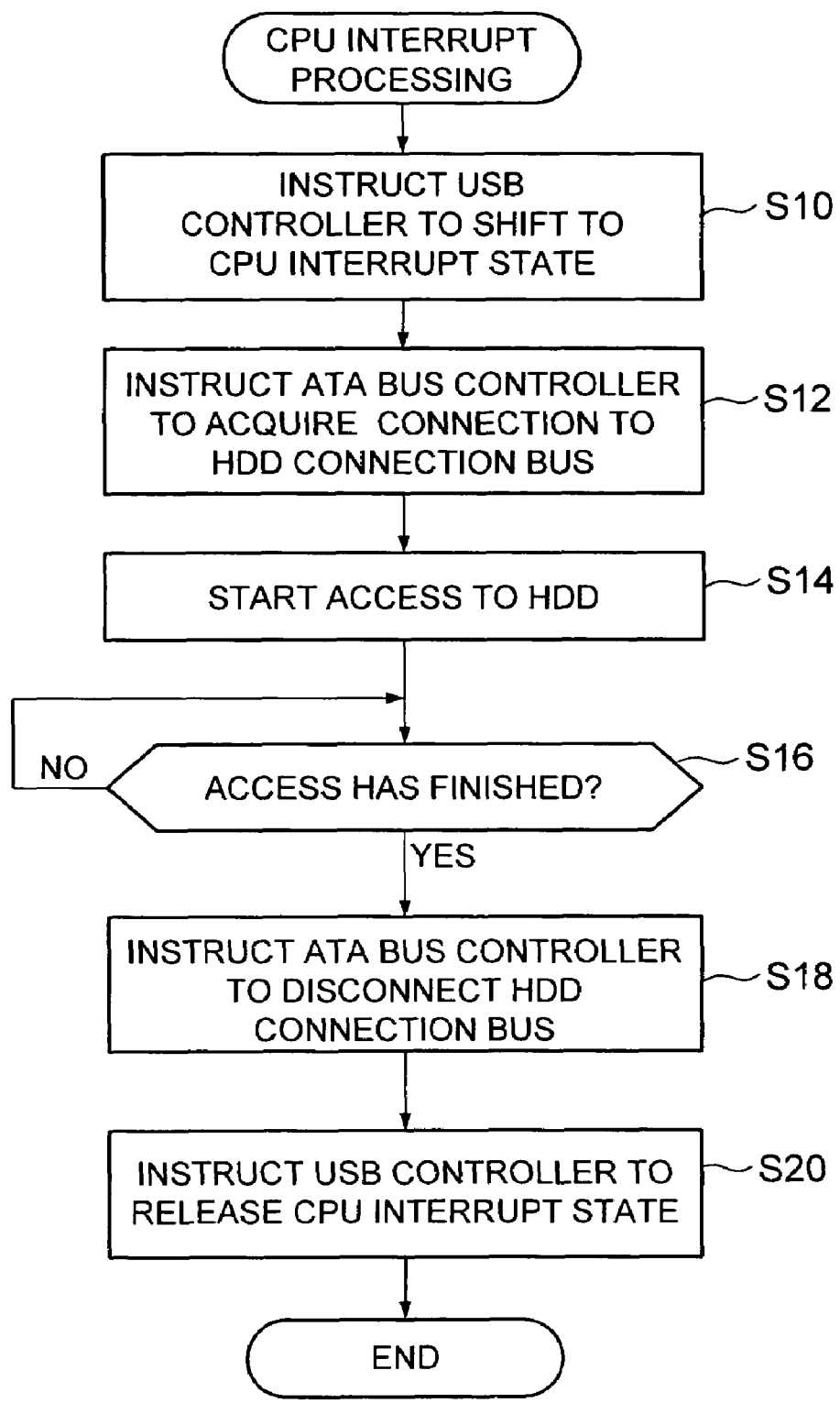
FIG. 4 is a flowchart explaining the contents of CPU interrupt processing according to the first embodiment.

FIG. 4 is a flowchart explaining the processing contents of the CPU 38 when the CPU 38 performs an interrupt to access the hard disk drive 34 while the personal computer 10 is accessing the hard disk drive 34. Namely, this CPU interrupt processing is started when an interrupt request is generated in the CPU 38. In this embodiment, this CPU interrupt processing is realized by making the CPU 38 read and execute a CPU interrupt program stored in a ROM incorporated in the CPU 38.

First, the CPU 38 instructs the USB controller 32 to shift to a CPU interrupt state (step S10). This instruction is communicated as a control signal from the CPU 38 to the USB controller 32.

Then, the CPU 38 instructs the ATA bus controller 36 to acquire an electrical connection to the hard disk drive connection bus 40 (step S12). This instruction is communicated as a control signal from the CPU 38 to the ATA bus controller 36. In accordance with this instruction, the ATA bus controller 36 releases a high-impedance connection to the hard disk drive connection bus 40.

Thereafter, the CPU 38 starts access to the hard disk drive 34 (step 514). Namely, both read/write are allowed with respect to the first area 50, whereas write is not allowed but read is allowed with respect to the second area 52.

Subsequently, the CPU 38 judges whether the access to the hard disk drive 34 has finished (step S16). When the access has not finished (step S16: No), the CPU 38 continues the access.

On the other hand, when the access has finished (step S16: Yes), the CPU 38 instructs the ATA bus controller 36 to disconnect the hard disk drive connection bus 40 (step S18). This instruction is communicated as a control signal from the CPU 38 to the ATA bus controller 36. In accordance with this instruction, the ATA bus controller 36 sets the connection to the hard disk drive connection bus 40 to high impedance.

Then, the CPU 38 instructs the USB controller 32 to release the CPU interrupt state (step S20). This instruction is communicated as a control signal from the CPU 38 to the USB controller 32. In accordance with this, the CPU interrupt state is released, and the access from the personal computer 10 to the hard disk drive 34 is resumed. Thus, the CPU interrupt processing according to this embodiment is completed.

Figure 5:
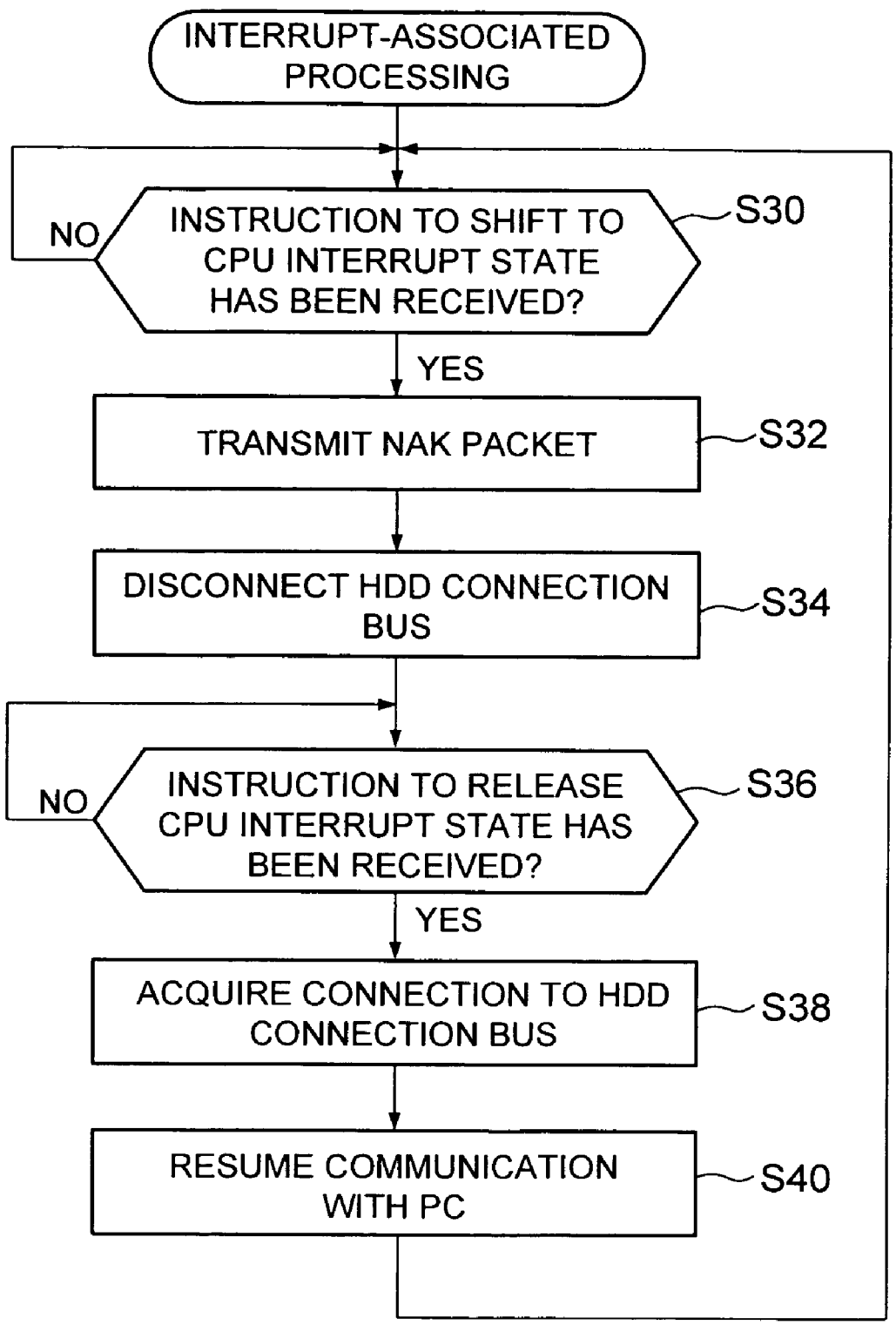
FIG. 5 is a flowchart explaining the contents of interrupt-associated processing according to the first embodiment.
Figure 6:
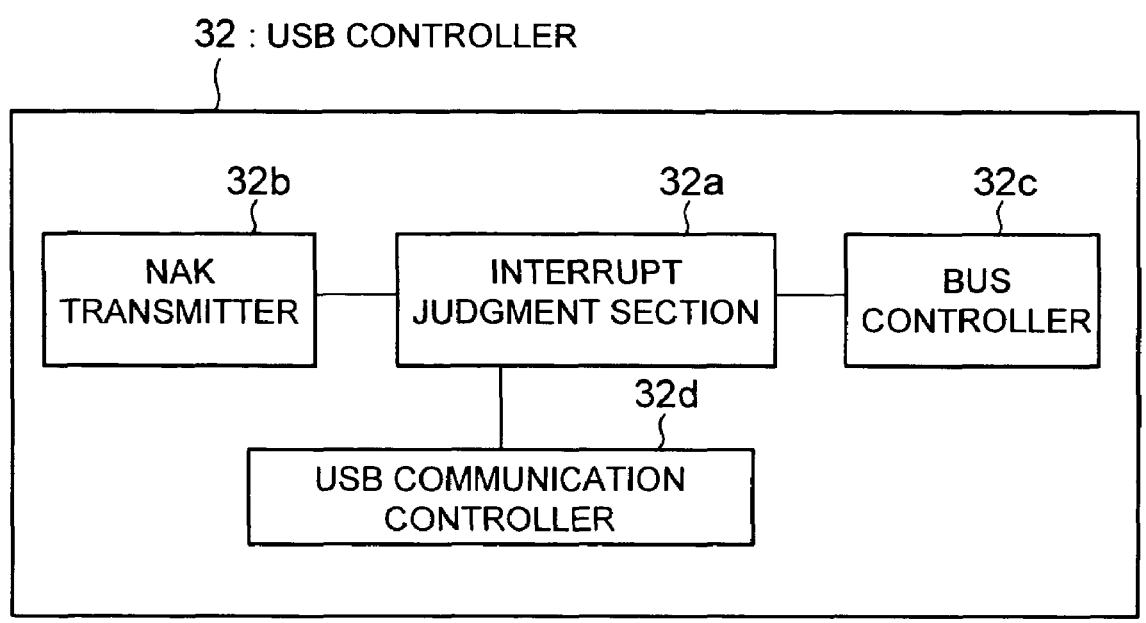
FIG. 6 is a diagram showing an example of the internal configuration of a USB controller according to the first embodiment.

FIG. 5 is a flowchart explaining the processing contents of interrupt-associated processing executed by the USB controller 32. This interrupt-associated processing is regularly executed by the USB controller 32. In this embodiment, this interrupt-associated processing is realized by hardware in the USB controller 32. FIG. 6 is a block diagram showing an example of the internal configuration of the USB controller 32 to realize this interrupt-associated processing.

As shown in FIG. 5, the USB controller 32 judges whether the instruction to shift to the CPU interrupt state has been received from the CPU 38 (step S30). This judgment is performed by an interrupt judgment section 32*a* of the USB controller 32. When the instruction to shift to the CPU interrupt state has not been received (step S30: NO), the USB controller 32 stands by while repeating step S30.

On the other hand, when the instruction to shift to the CPU interrupt state has been received (step S30: YES), a setting of automatically transmitting a NAK (negative acknowledge) packet in reply to a packet from the personal computer 10 is made (step S32). More specifically, the interrupt judgment section 32*a* sets a NAK transmitter 32*b* so that the NAK packet is automatically transmitted.

The personal computer 10 to which the NAK packet has been transmitted judges that the information terminal 20 did not properly receive the packet from the personal computer 10, and transmits the same packet again. Hence, in the CPU interrupt state, the personal computer 10 continues transmitting the same packet.

Then, the USB controller 32 electrically disconnects the hard disk drive connection bus 40 (step S34). Namely, the USB controller 32 sets the connection to the hard disk drive connection bus 40 to high impedance. More specifically, a bus controller 32*c* sets the connection to the hard disk drive connection bus 40 to high impedance.

Thereafter, the USB controller 32 judges whether the instruction to release the CPU interrupt state has been received from the CPU 38 (step S36). This judgment is also performed by the interrupt judgment section 32*a* of the USB controller 32. When this instruction to release the CPU interrupt state has not been received (step S36: NO), the USB controller stands by while repeating the process in step S36.

On the other hand, when the instruction to release the CPU interrupt state has been received (step S36: YES), the USB controller 32 acquires an electrical connection to the hard disk drive connection bus 40 (step S38). Namely, the USB controller 32 releases the high impedance connection to the hard disk drive connection bus 40. More specifically, the bus controller 32*c* releases the high impedance connection to the hard disk drive connection bus 40.

Then, the USB controller 32 resumes communication with the personal computer 10 (step S40). Namely, although in and after step S32, the NAK packet is automatically transmitted in reply to the packet transmitted from the personal computer 10, this setting is cancelled, and normal communication is performed. More specifically, the interrupt judgment section 32*a* cancels the setting of transmitting the NAK packet in the NAK transmitter 32*b*. Then, a USB communication controller 32*d* performs normal USB communication.

The personal computer 10 repeatedly transmits the same packet until this time, but after this time, an ACK (acknowledge) packet is transmitted from the USB controller 32 when the packet from the personal computer 10 has been properly received by the information terminal 20, so that normal communication can be performed.

As described above, according to the information processing system of this embodiment, even while data is being exchanged between the personal computer 10 and the hard disk drive 34, the CPU 38 can perform an interrupt to access the hard disk drive 34. Namely, the CPU 38 can read and write data from and to the first area 50 of the hard disk drive 34, and read data from the second area 52.

Therefore, when the information terminal 20 is a still image reproducing apparatus, a user can operate the information terminal 20 to create images for a thumbnail or images for a slide show and store them in the hard disk drive 34 even while image data is being transferred from the personal computer 10 to the still image reproducing apparatus. In particular, these days, the number of pixels of a digital camera is increasing and even moving images are often taken by the digital camera, so that a folder in which images and moving images to be transferred to the information terminal 20 are stored often exceeds 1 GB. Generally, in the actual situation, when 1 GB data is transferred by USB 2.0, it takes about one minute to transfer the whole data since the actual file transfer rate is approximately 20 MBps. By the user creating images for a thumbnail and storing them in the hard disk drive 34 during this transfer, it becomes possible to display the thumbnail on a screen of the information terminal 20 even while data is being transferred.

Consequently, the user can confirm whether the data which is being transferred is what was intended by the user, and when it is wrong, the user can immediately perform cancellation processing. Moreover, immediately after the completion of transfer of image data from the personal computer 10, the user can display the thumbnail or perform the slide show, which results in a remarkable improvement in user-friendliness.

When the information terminal 20 is a moving image reproducing apparatus, the user can extract several frames from moving image data while the moving image data is being transferred, create a file for confirming the contents of moving images, and store it in the hard disk drive 34. As a result, while the moving image data is being transferred from the personal computer 10 to the information terminal 20, the user can watch a digest of the moving images or the moving images themselves on the screen of the information terminal 20, and thereby can confirm whether the file is an intended moving image file. Further, by watching the digest of the moving images, the user can easily locate a moving image which he or she wants to watch, which results in an improvement in user-friendliness.

When the information terminal 20 is a music reproducing apparatus, while music data is being transferred from the personal computer 10, the user can reproduce and listen to the music and confirm whether the music data being transferred is an intended music file.

Furthermore, the CPU 38 only instructs the USB controller 32 to perform switching to a mode to automatically transmit the NAK packet, which makes it possible to hardly impose any load on the CPU 38. Additionally, the USB controller 32 performs mode switching control as to whether the NAK packet is automatically transmitted and data transfer control, whereby the data transfer rate can be increased as compared with a case where the CPU 38 performs these controls.

Second Embodiment

In the aforementioned first embodiment, the personal computer 10 and the information terminal 20 are connected by the USB 2.0 standard, but in the second embodiment of the present invention, they are connected by the IEEE 1394 standard. Hereinafter, only portions different from those in the first embodiment will be described.

Figure 7:
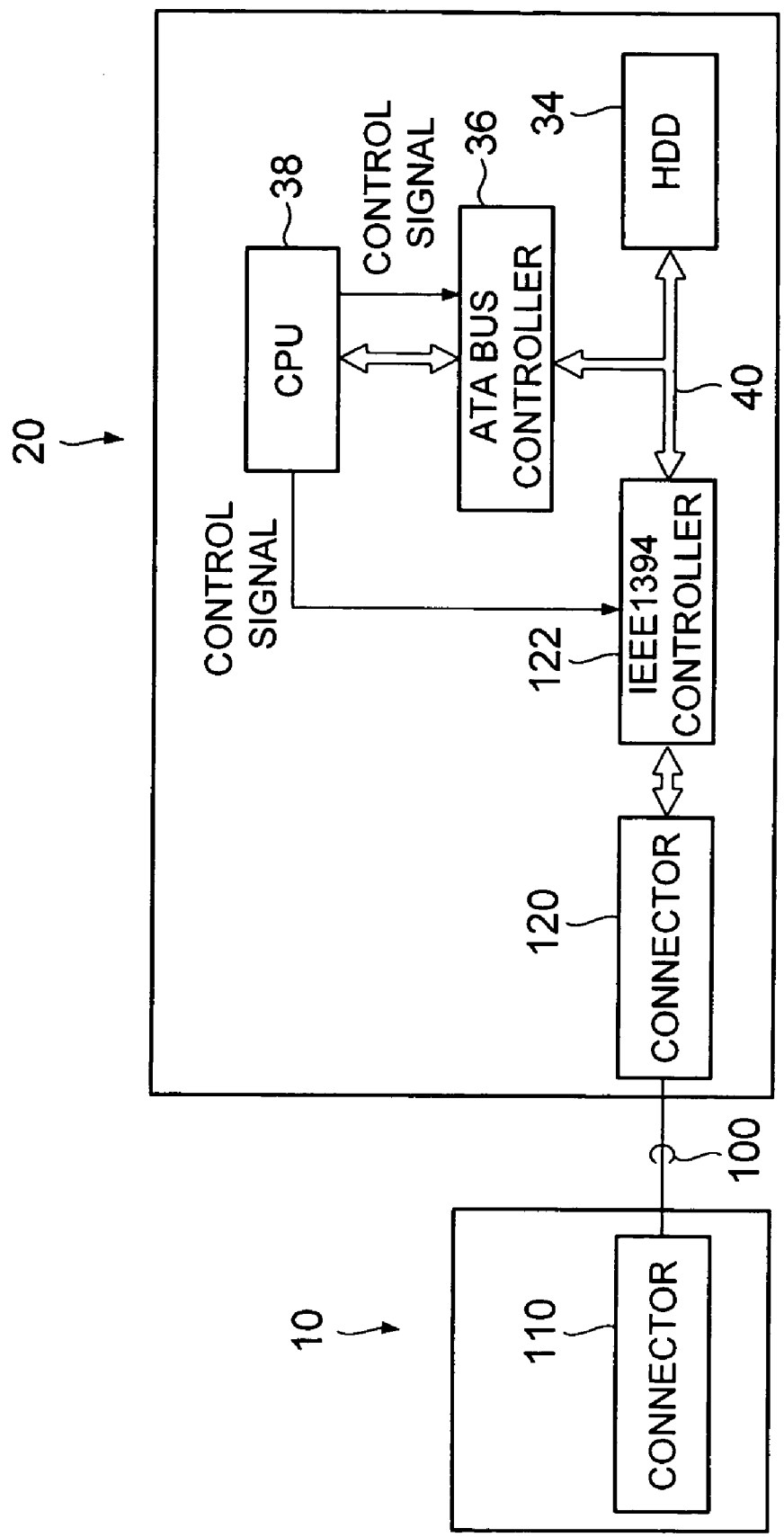
FIG. 7 is a block diagram showing an example of the configuration of an information processing system according to a second embodiment of the present invention.

FIG. 7 is a block diagram showing the configuration of an information processing system according to this embodiment. As shown in FIG. 7, in the information processing system according to this embodiment, the personal computer 10 and the information terminal 20 are connected by an IEEE 1394 cable 100. Namely, a connector 110 provided on one end side of the IEEE 1394 cable 100 is connected to the personal computer 10, and a connector 120 provide on the other end side of the IEEE 1394 cable 100 is connected to the information terminal 20.

The information terminal 20 includes therein an IEEE 1394 controller 122 in place of the USB controller 32. The other configuration is the same as that in the aforementioned first embodiment.

Figure 8:
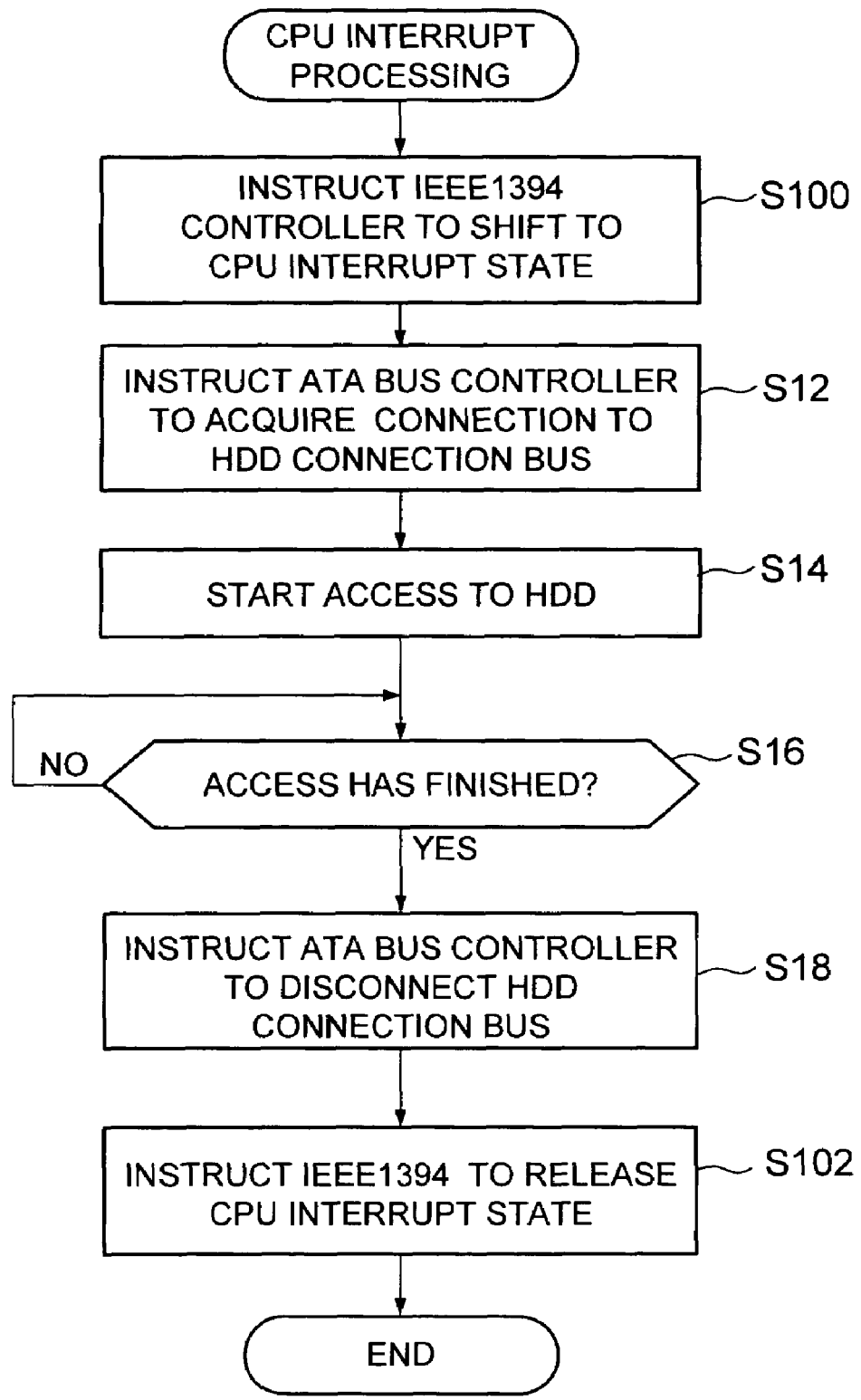
FIG. 8 is a flowchart explaining the contents of CPU interrupt processing according to the second embodiment.

FIG. 8 is a flowchart explaining the processing contents of the CPU 38 when the CPU 38 performs an interrupt to access the hard disk drive 34 while the personal computer 10 is accessing the hard disk drive 34, and corresponds to FIG. 4 in the aforementioned first embodiment.

In this CPU interrupt processing, first, in step S100, the CPU 38 instructs the IEEE 1394 controller 122 to shift to a CPU interrupt state (step S100). This instruction is communicated as a control signal from the CPU 38 to the IEEE 1394 controller 122.

Then, the CPU 38 instructs the IEEE 1394 controller 122 to release the CPU interrupt state in last step S102 (step S102). This instruction is communicated as a control signal from the CPU 38 to the IEEE 1394 controller 122. In accordance with this, the CPU interrupt state is released, and the access from the personal computer 10 to the hard disk drive 34 is resumed. The other processing is the same as that in the aforementioned first embodiment.

Figure 9:
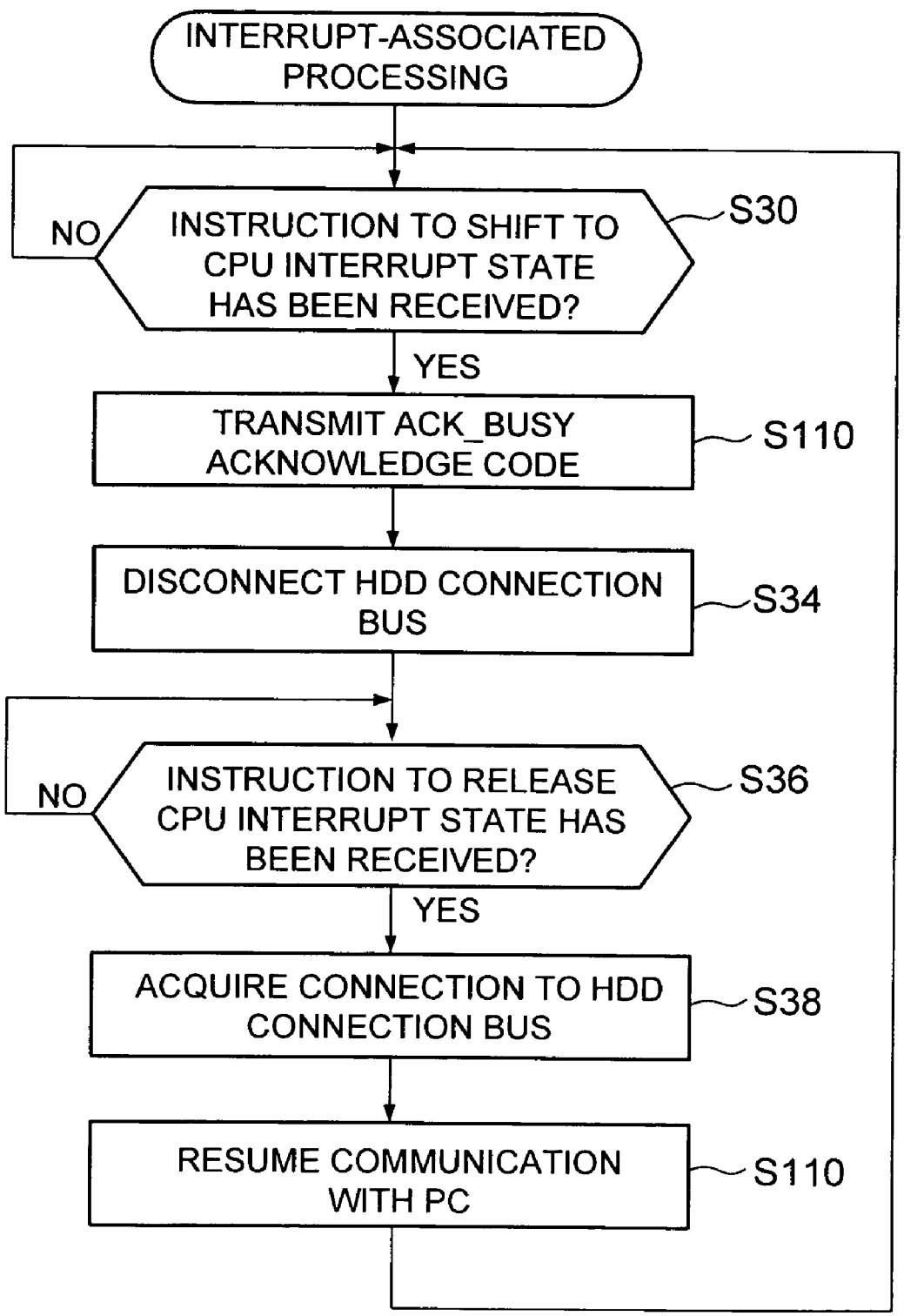
FIG. 9 is a flowchart explaining the contents of interrupt-associated processing according to the second embodiment.
Figure 10:
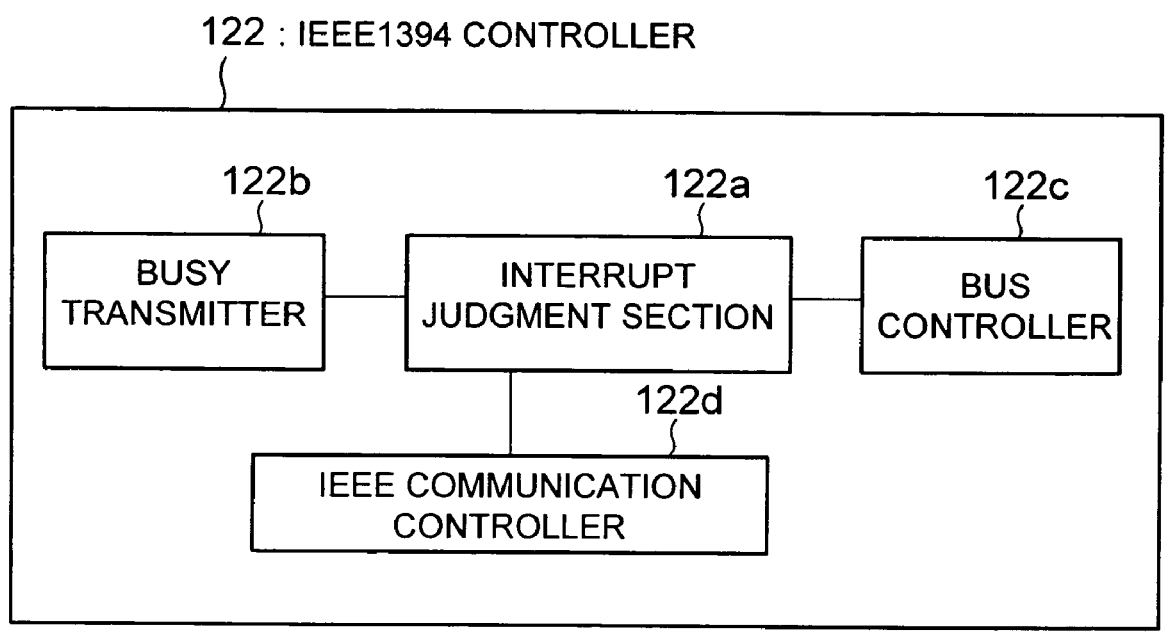
FIG. 10 is a diagram showing an example of the internal configuration of an IEEE 1394 controller according to the second embodiment.

FIG. 9 is a flowchart explaining the processing contents of interrupt-associated processing executed by the IEEE 1394 controller 122, and corresponds to FIG. 5 in the aforementioned first embodiment. FIG. 10 is a block diagram showing an example of the internal configuration of the IEEE 1394 controller 122 to realize this interrupt-associated processing. As shown in FIG. 10, the IEEE 1394 controller 122 includes an interrupt judgment section 122a, a busy transmitter 122b, a bus controller 122c, and an IEEE communication controller 122d. A function of the interrupt judgment section 122a corresponds to that of the interrupt judgment section 32a in FIG. 6, a function of the busy transmitter 122b corresponds to that of the NAK transmitter 32b in FIG. 6, a function of the bus controller 122c corresponds to that of the bus controller 32c in FIG. 6, and a function of the IEEE communication controller 122d corresponds to that of the USB communication controller 32d in FIG. 6.

As shown in FIG. 9, when judging that the instruction to shift to the CPU interrupt state has been received in step S30 (step S30: YES), the IEEE 1394 controller 122 performs a setting of automatically transmitting an ACK_BUSY acknowledge code in reply to a packet from the personal computer 10 (step S110). More specifically, when judging that the instruction to shift to the CPU interrupt state has been received, the interrupt judgment section 122a sets the busy transmitter 122b so that the ACK_BUSY acknowledge code is automatically transmitted.

The personal computer 10 to which the ACK_BUSY acknowledge code has been transmitted judges that the information terminal 20 did not properly receive the packet from the personal computer 10, it transmits the same packet again. Hence, in the CPU interrupt state, the personal computer 10 continues transmitting the same packet.

Further, when judging that the instruction to release the CPU interrupt state has been received in step S36 (step S36: YES), the bus controller 122c of the IEEE 1394 controller 122 acquires an electrical connection to the hard disk drive connection bus 40 (step S38), and resumes communication with the personal computer 10 (step S112).

Namely, although in and after step S110, the busy transmitter 122b automatically transmits the ACK_BUSY acknowledge code in reply to the packet transmitted from the personal computer 10, in step S112, this setting is cancelled and the IEEE communication controller 122d performs normal communication. The personal computer 10 repeatedly transmits the same packet until this time, but after this time, an acknowledge code to the effect that the packet from the personal computer 10 has been properly received is transmitted from the IEEE 1394 controller 122 when the packet has been properly received by the information terminal 20, so that normal communication can be performed. The other processing is the same as that in the aforementioned first embodiment.

As described above, also according to the information processing system of this embodiment, even while data is being exchanged between the personal computer 10 and the hard disk drive 34, the CPU 38 can perform an interrupt to access the hard disk drive 34. Namely, the CPU 38 can read and write data from and to the first area 50 of the hard disk drive 34, and read data from the second area 52.

Third Embodiment

The third embodiment of the present invention is another modification of the aforementioned first embodiment, and the personal computer 10 and the information terminal 20 are connected by the BLUETOOTH standard. Hereinafter, only portions different from those in the first embodiment will be described.

Figure 11:
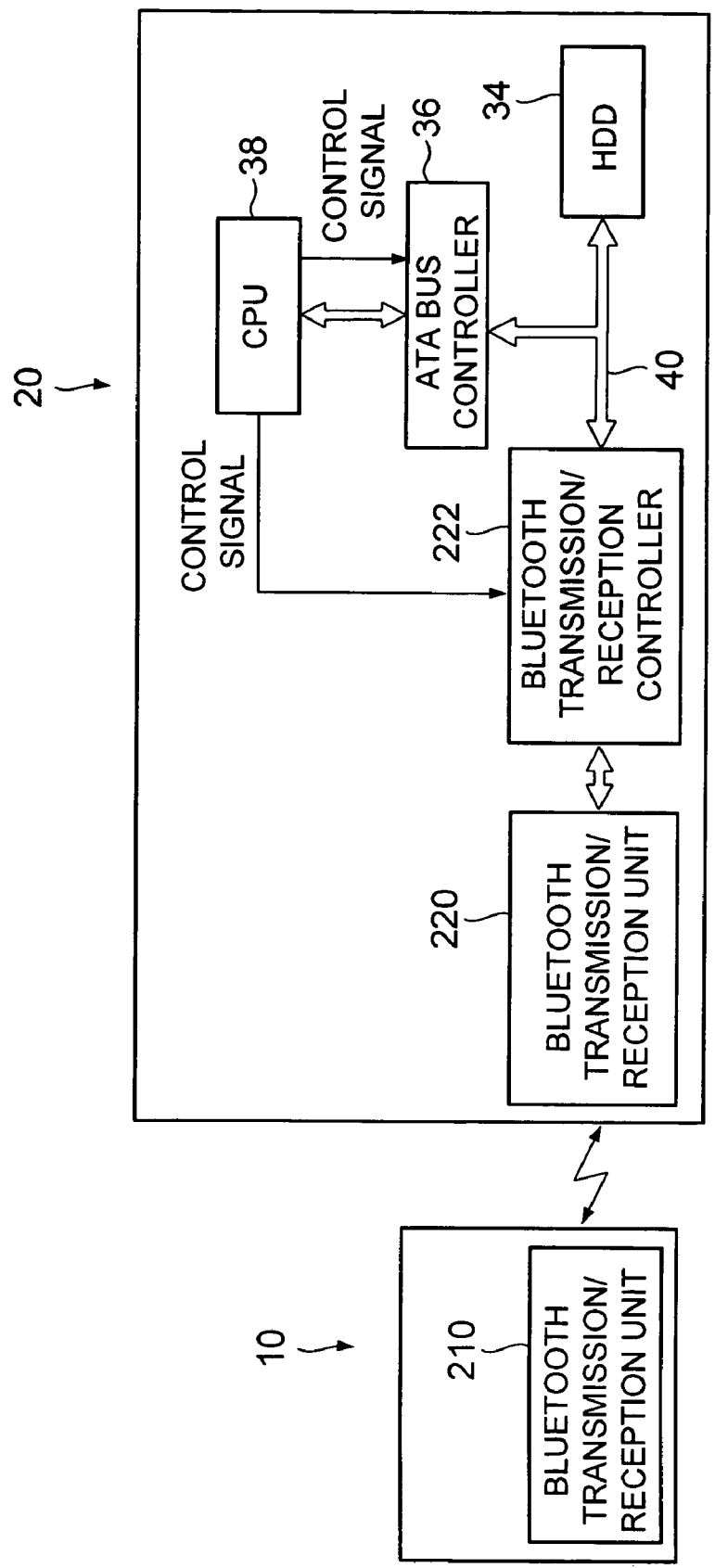
FIG. 11 is a block diagram showing an example of the configuration of an information processing system according to a third embodiment of the present invention.

FIG. 11 is a block diagram showing the configuration of an information processing system according to this embodiment. As shown in FIG. 11, in the information processing system according to this embodiment, the personal computer 10 and the information terminal 20 are connected by wireless based on the BLUETOOTH communication standard. Namely, a BLUETOOTH transmission/reception unit 210 and a BLUETOOTH transmission/reception unit 220 are connected by wireless, by which the personal computer 10 and the information terminal 20 are connected to each other.

The information terminal 20 includes a BLUETOOTH transmission/reception controller 222 in place of the USB controller 32. The other configuration is the same as that in the aforementioned first embodiment.

Figure 12:
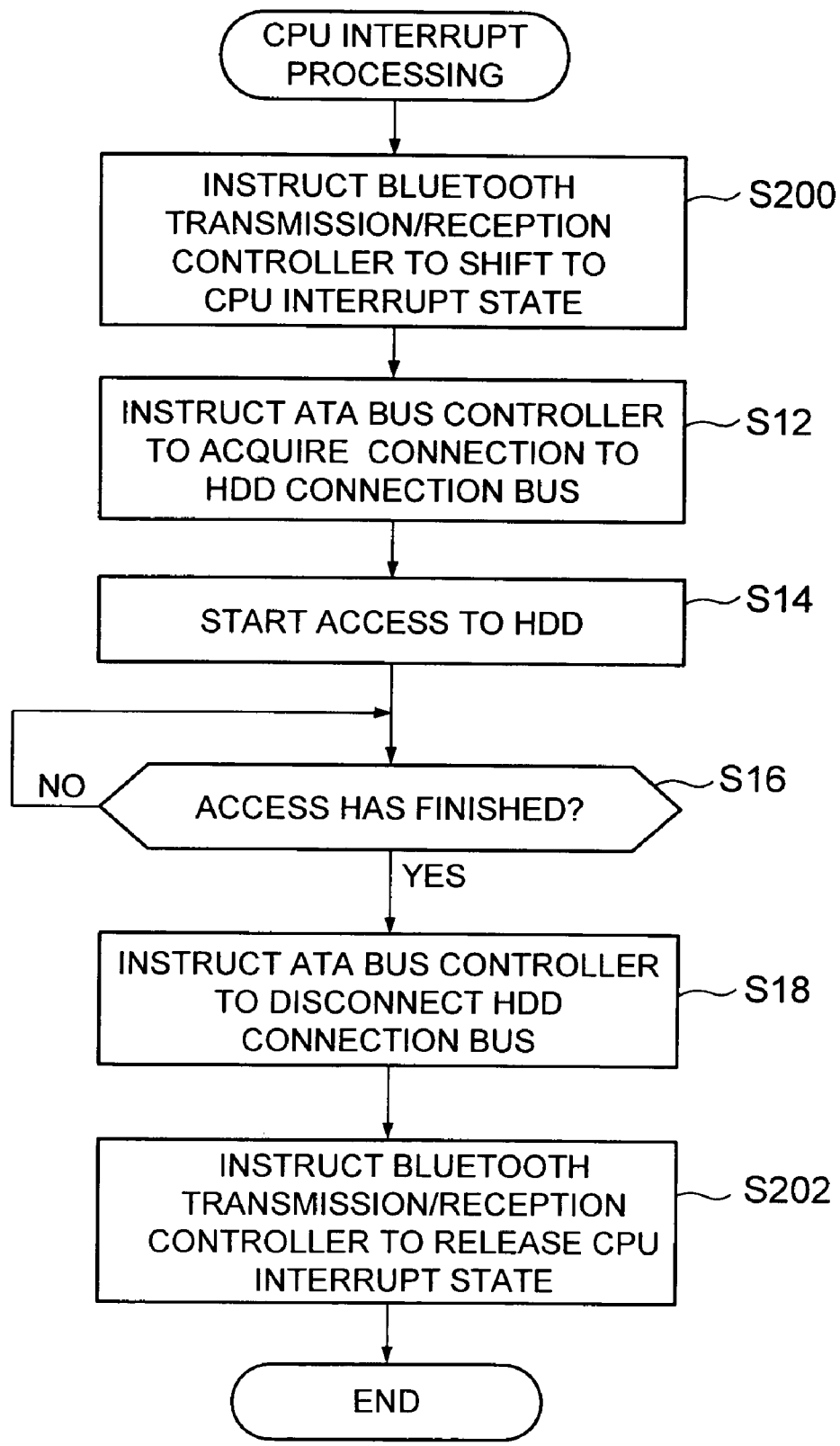
FIG. 12 is a flowchart explaining the contents of CPU interrupt processing according to the third embodiment.

FIG. 12 is a flowchart explaining the processing contents of the CPU 38 when the CPU 38 performs an interrupt to access the hard disk drive 34 while the personal computer 10 is accessing the hard disk drive 34, and corresponds to FIG. 4 in the aforementioned first embodiment.

In this CPU interrupt processing, first, in step S200, the CPU 38 instructs the BLUETOOTH transmission/reception controller 222 to shift to a CPU interrupt state (step S200). This instruction is communicated as a control signal from the CPU 38 to the BLUETOOTH transmission/reception controller 222.

Then, the CPU 38 instructs the BLUETOOTH transmission/reception controller 222 to release the CPU interrupt state in last step S202 (step S202). This instruction is communicated as a control signal from the CPU 38 to the BLUETOOTH transmission/reception controller 222. In accordance with this, the CPU interrupt state is released, and the access from the personal computer 10 to the hard disk drive 34 is resumed. The other processing is the same as that in the aforementioned first embodiment.

Figure 13:
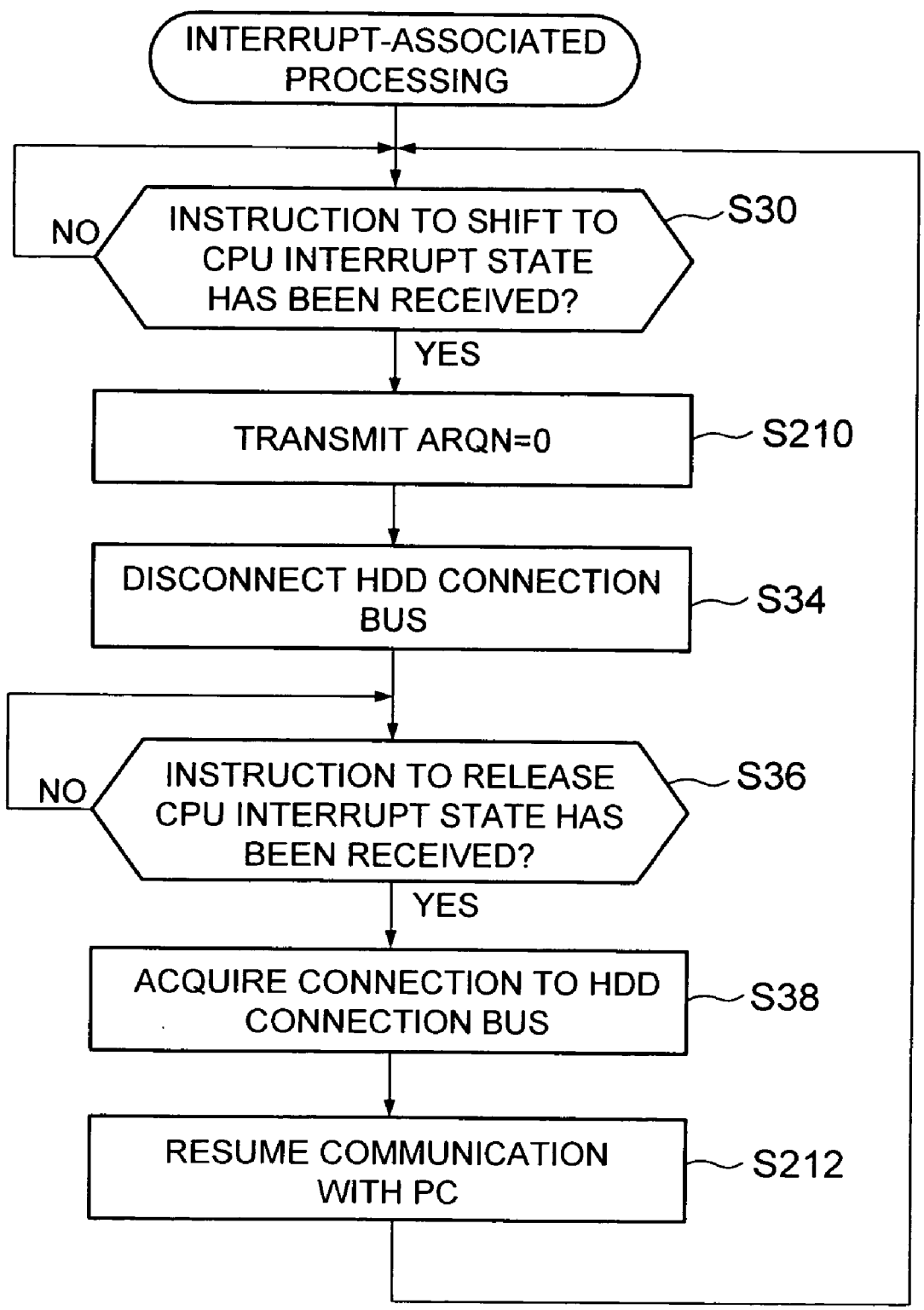
FIG. 13 is a flowchart explaining the contents of interrupt-associated processing according to the third embodiment.
Figure 14:
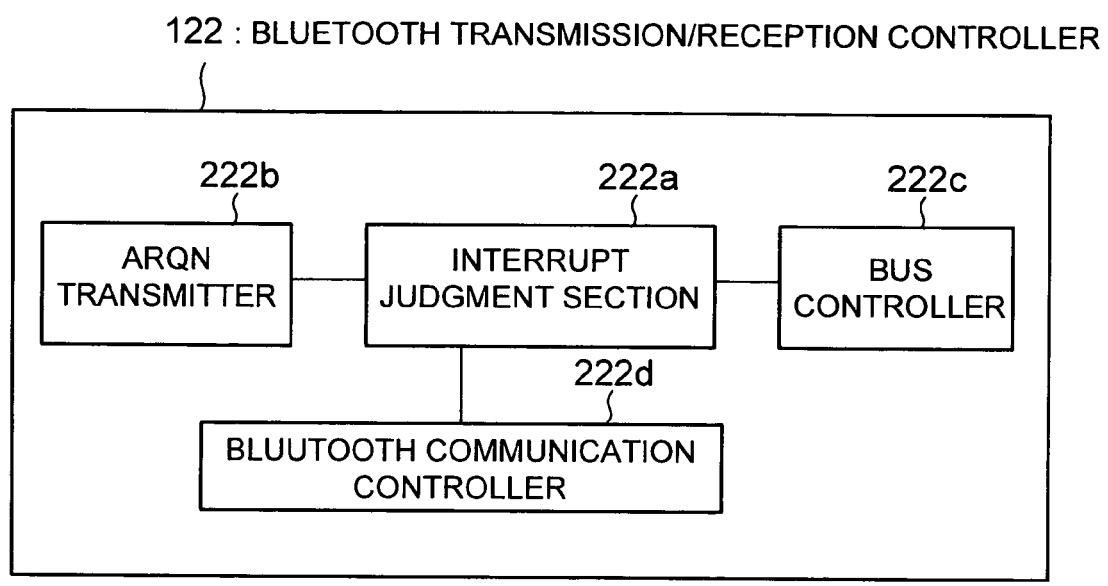
FIG. 14 is a diagram showing an example of the internal configuration of a BLUETOOTH transmission/reception controller according to the third embodiment.

FIG. 13 is a flowchart explaining the processing contents of interrupt-associated processing executed by the BLUETOOTH transmission/reception controller 222, and corresponds to FIG. 5 in the aforementioned first embodiment. FIG. 14 is a block diagram showing an example of the internal configuration of the BLUETOOTH transmission/reception controller 222 to realize this interrupt-associated processing. As shown in FIG. 14, the BLUETOOTH transmission/reception controller 222 includes an interrupt judgment section 222a, an ARQN transmitter 222b, a bus controller 222c, and a BLUETOOTH communication controller 222d. A function of the interrupt judgment section 222a corresponds to that of the interrupt judgment section 32a in FIG. 6, a function of the ARQN transmitter 222b corresponds to that of the NAK transmitter 32b in FIG. 6, a function of the bus controller 222c corresponds to that of the bus controller 32c in FIG. 6, and a function of the BLUETOOTH communication controller 222d corresponds to that of the USB communication controller 32d in FIG. 6.

As shown in FIG. 13, when judging that the instruction to shift to the CPU interrupt state has been received in step S30 (step S30: YES), the BLUETOOTH transmission/reception controller 222 performs a setting of automatically transmitting ARQN=0 in reply to a packet from the personal computer 10 (step S210). More specifically, when judging that the instruction to shift to the CPU interrupt state has been received, the interrupt judgment section 222a sets the ARQN transmitter 222b so that ARQN=0 is automatically transmitted.

Here, the BOUETOOTH standard will be explained in brief. In BLUETOOTH, a packet for reception confirmation itself does not exist, and hence reception confirmation is performed using 1-bit ARQN field in a packet header, instead. When the packet from the personal computer 10 has been properly received, a packet of ARQN=1 which means acknowledgement is transmitted, and when the packet has not been properly received, a packet of ARQN=0 which means negative acknowledgement is transmitted.

The personal computer 10 to which the ARQN=0 has been transmitted judges that the information terminal 20 did not properly receive the packet from the personal computer 10, it transmits the same packet again. Hence, in the CPU interrupt state, the personal computer 10 continues transmitting the same packet.

Further, when judging that the instruction to release the CPU interrupt state has been received in step S36 (step S36: YES), the bus controller 222c of the BLUETOOTH transmission/reception controller 222 acquires an electrical connection to the hard disk drive connection bus 40 (step S38), and resumes communication with the personal computer 10 (step S212).

Namely, although in and after step S210, the ARQN transmitter 222b automatically transmits the packet including ARQN=0 in its header in reply to the packet transmitted from the personal computer 10, in step S212, this setting is cancelled and the BLUETOOTH communication controller 222d performs normal communication. The personal computer 10 repeatedly transmits the same packet until this time, but after this time, ARQN=1 to the effect that the packet from the personal computer 10 has been properly received is transmitted from the BLUETOOTH communication controller 222d of the BLUETOOTH transmission/reception controller 222 when the packet has been properly received by the information terminal 20, so that normal communication can be performed. The other processing is the same as that in the aforementioned first embodiment.

As described above, also according to the information processing system of this embodiment, even while data is being exchanged between the personal computer 10 and the hard disk drive 34, the CPU 38 can perform an interrupt to access the hard disk drive 34. Namely, the CPU 38 can read and write data from and to the first area 50 of the hard disk drive 34, and read data from the second area 52.

Fourth Embodiment

The fourth embodiment of the present invention is still another modification of the aforementioned first embodiment, and the personal computer 10 and the information terminal 20 are connected by the TCP/IP standard. Hereinafter, only portions different from those in the first embodiment will be described.

Figure 15:
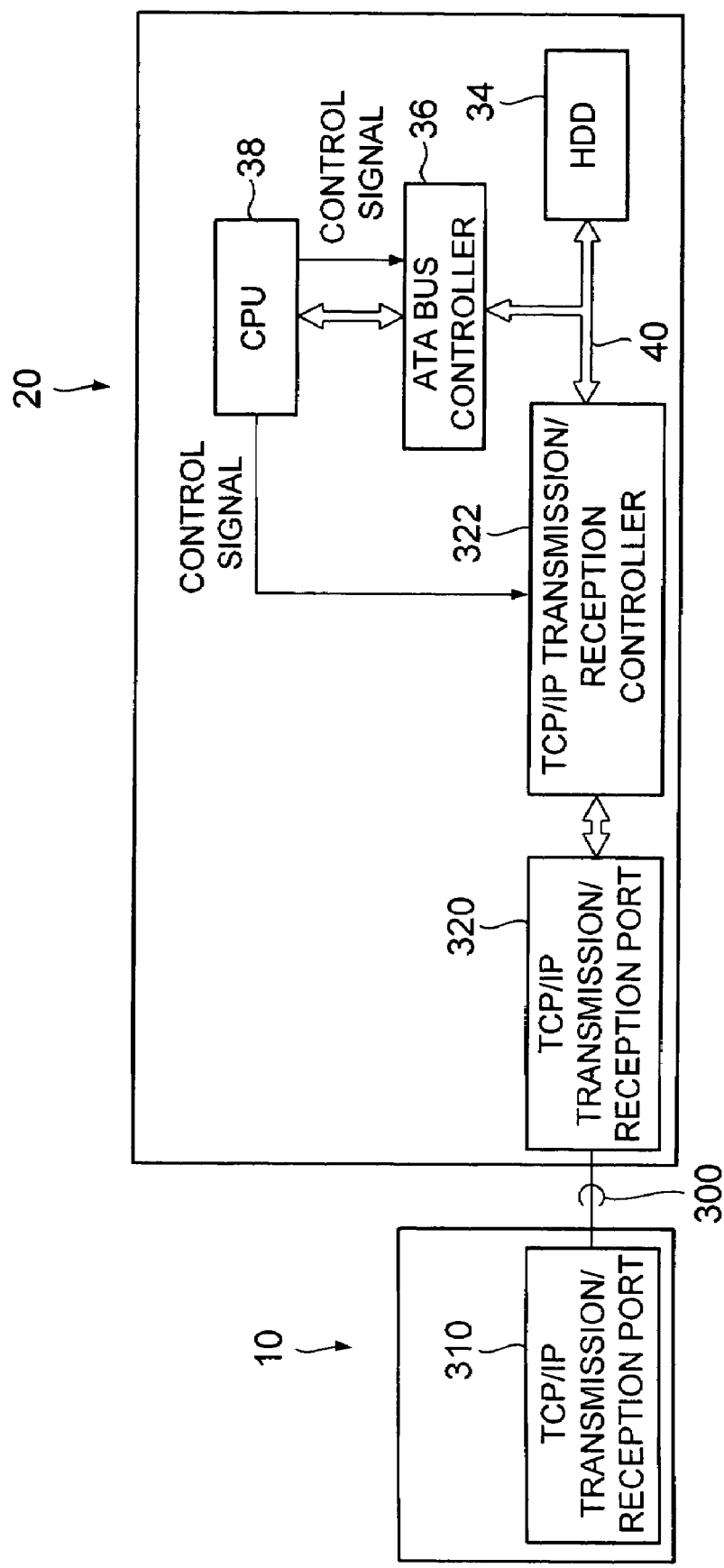
FIG. 15 is a block diagram showing an example of the configuration of an information processing system according to a fourth embodiment of the present invention.

FIG. 15 is a block diagram showing the configuration of an information processing system according to this embodiment. As shown in FIG. 15, in the information processing system according to this embodiment, the personal computer 10 and the information terminal 20 are connected by a TCP/IP cable 300. Namely, one end of the TCP/IP cable 300 is connected to the personal computer 10 via a TCP/IP transmission/reception port 310, and the other end of the TCP/IP cable 300 is connected to the information terminal 20 via a TCP/IP transmission/reception port 320.

The information terminal 20 includes a TCP/IP transmission/reception controller 322 in place of the USB controller 32. The other configuration is the same as that in the aforementioned first embodiment.

Figure 16:
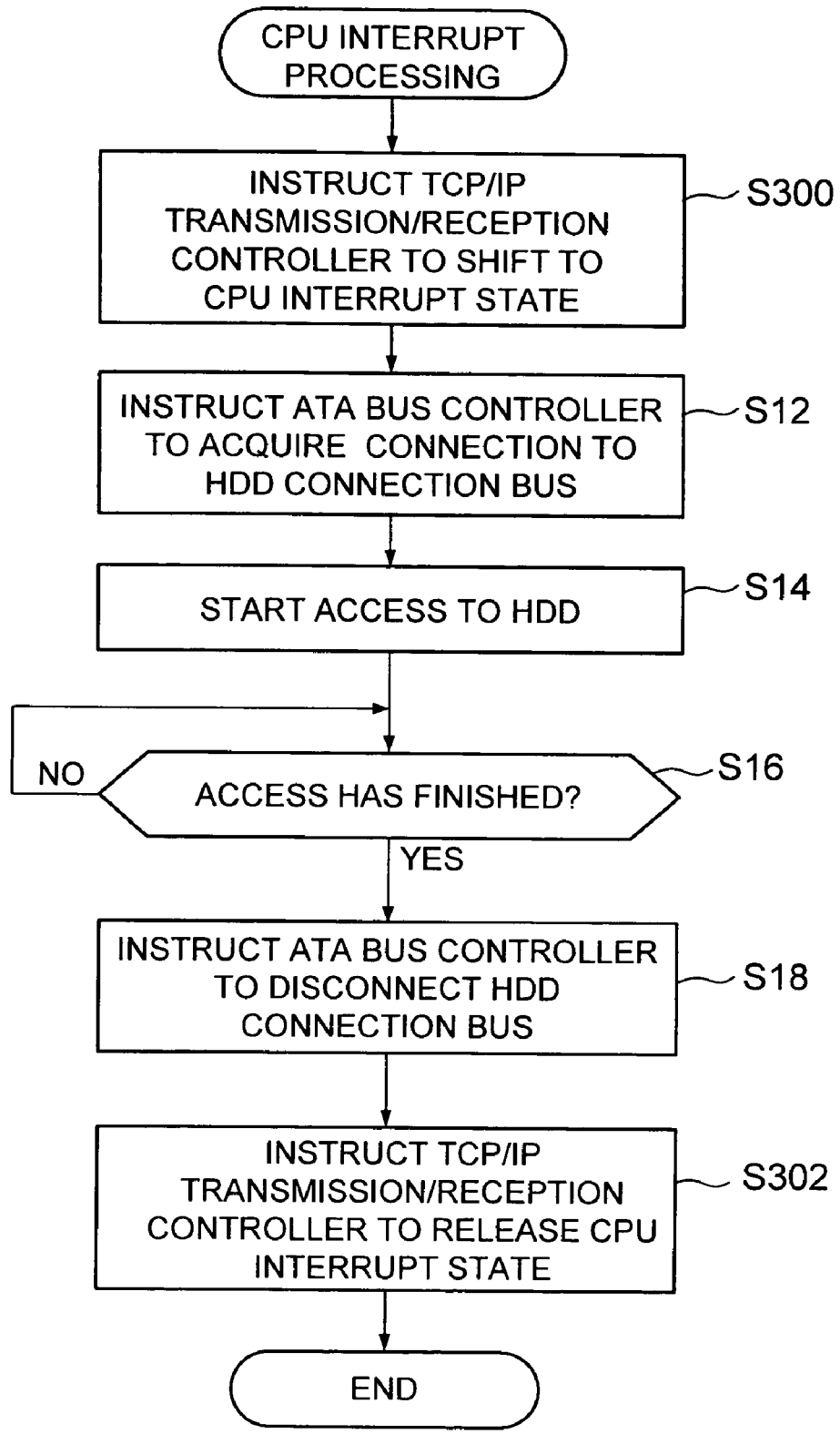
FIG. 16 is a flowchart explaining the contents of CPU interrupt processing according to the fourth embodiment.

FIG. 16 is a flowchart explaining the processing contents of the CPU 38 when the CPU 38 performs an interrupt to access the hard disk drive 34 while the personal computer 10 is accessing the hard disk drive 34, and corresponds to FIG. 4 in the aforementioned first embodiment.

In this CPU interrupt processing, first, in step S300, the CPU 38 instructs the TCP/IP transmission/reception controller 322 to shift to a CPU interrupt state (step S300). This instruction is communicated as a control signal from the CPU 38 to the TCP/IP transmission/reception controller 322.

Then, the CPU 38 instructs the TCP/IP transmission/reception controller 322 to release the CPU interrupt state in last step S302 (step S302). This instruction is communicated as a control signal from the CPU 38 to the TCP/IP transmission/reception controller 322. In accordance with this, the CPU interrupt state is released, and the access from the personal computer 10 to the hard disk drive 34 is resumed. The other processing is the same as that in the aforementioned first embodiment.

Figure 17:
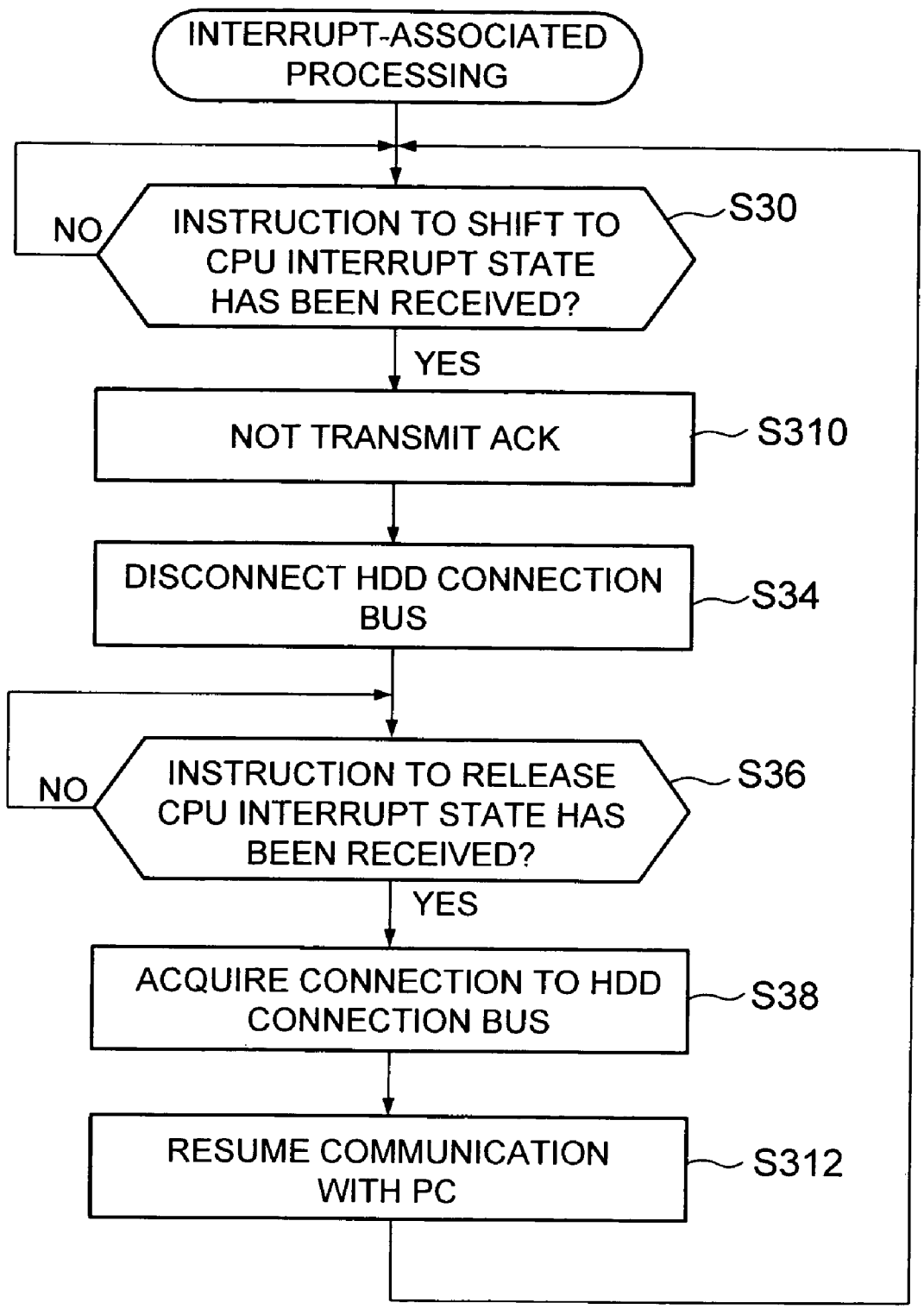
FIG. 17 is a flowchart explaining the contents of interrupt-associated processing according to the fourth embodiment.
Figure 18:
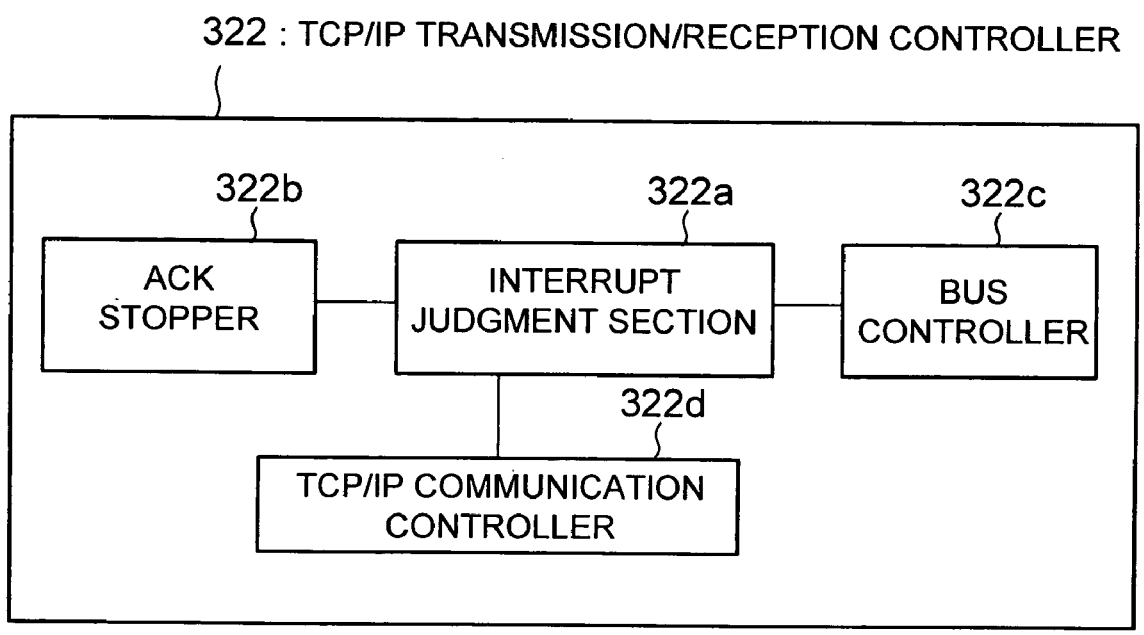
FIG. 18 is a diagram showing an example of the internal configuration of a TCP/IP transmission/reception controller according to the fourth embodiment.

FIG. 17 is a flowchart explaining the processing contents of interrupt-associated processing executed by the TCP/IP transmission/reception controller 322, and corresponds to FIG. 5 in the aforementioned first embodiment. FIG. 18 is a block diagram showing an example of the internal configuration of the TCP/IP transmission/reception controller 322 to realize this interrupt-associated processing. As shown in FIG. 18, the TCP/IP transmission/reception controller 322 includes an interrupt judgment section 322a, an ACK stopper 322b, a bus controller 322c, and a TCP/IP communication controller 322d. A function of the interrupt judgment section 322a corresponds to that of the interrupt judgment section 32a in FIG. 6, a function of the ACK stopper 322b corresponds to that of the NAK transmitter 32b in FIG. 6, a function of the bus controller 322c corresponds to that of the bus controller 32c in FIG. 6, and a function of the TCP/IP communication controller 322d corresponds to that of the USB communication controller 32d in FIG. 6.

As shown in FIG. 17, when judging that the instruction to shift to the CPU interrupt state has been received in step S30 (step S30: YES), the TCP/IP transmission/reception controller 322 performs a setting of not transmitting ACK in reply to a data segment from the personal computer 10 (step S310). More specifically, when judging that the instruction to shift to the CPU interrupt state has been received, the interrupt judgment section 322a operates the ACK stopper 322b to perform the setting of not transmitting ACK.

Here, the TCP/IP standard will be explained in brief. In TCP/IP, with respect to all of transmitted data segments, acknowledgement by ACK is performed within a predetermined period of time. When a data segment is transmitted from a transmitting end, a timer starts, and when ACK is not received from a receiving end before the timer ends, the transmitting end regards the data segment as not having been properly received and performs retransmission. Hence, in the CPU interrupt state, the personal computer 10 continues transmitting the same packet.

Further, when judging that the instruction to release the CPU interrupt state has been received in step S36 (step S36: YES), the bus controller 322c of the TCP/IP transmission/reception controller 322 acquires an electrical connection to the hard disk drive connection bus 40 (step S38), and resumes communication with the personal computer 10 (step S312).

Namely, although in and after step S310, the ACK stopper 322b performs an operation of not transmitting ACK even when the data segment transmitted from the personal computer 10 has been properly received, in step S312, this operation of the ACK stopper 322b is stopped and the TCP/IP communication controller 322d performs normal communication. The personal computer 10 repeatedly transmits the same data segment until this time, but after this time, ACK to the effect that the data segment from the personal computer 10 has been properly received is transmitted from the TCP/IP communication controller 322d of the TCP/IP transmission/reception controller 322 when the data segment has been properly received by the information terminal 20, so that normal communication can be performed. The other processing is the same as that in the aforementioned first embodiment.

As described above, also according to the information processing system of this embodiment, even while data is being exchanged between the personal computer 10 and the hard disk drive 34, the CPU 38 can perform an interrupt to access the hard disk drive 34. Namely, the CPU 38 can read and write data from and to the first area 50 of the hard disk drive 34, and read data from the second area 52.

Fifth Embodiment

In the fifth embodiment of the present invention, the USB controller 32 and the ATA bust controller 36 in the aforementioned first embodiment are constituted by one IC. Hereinafter, only portions different from those in the first embodiment will be described.

Figure 19:
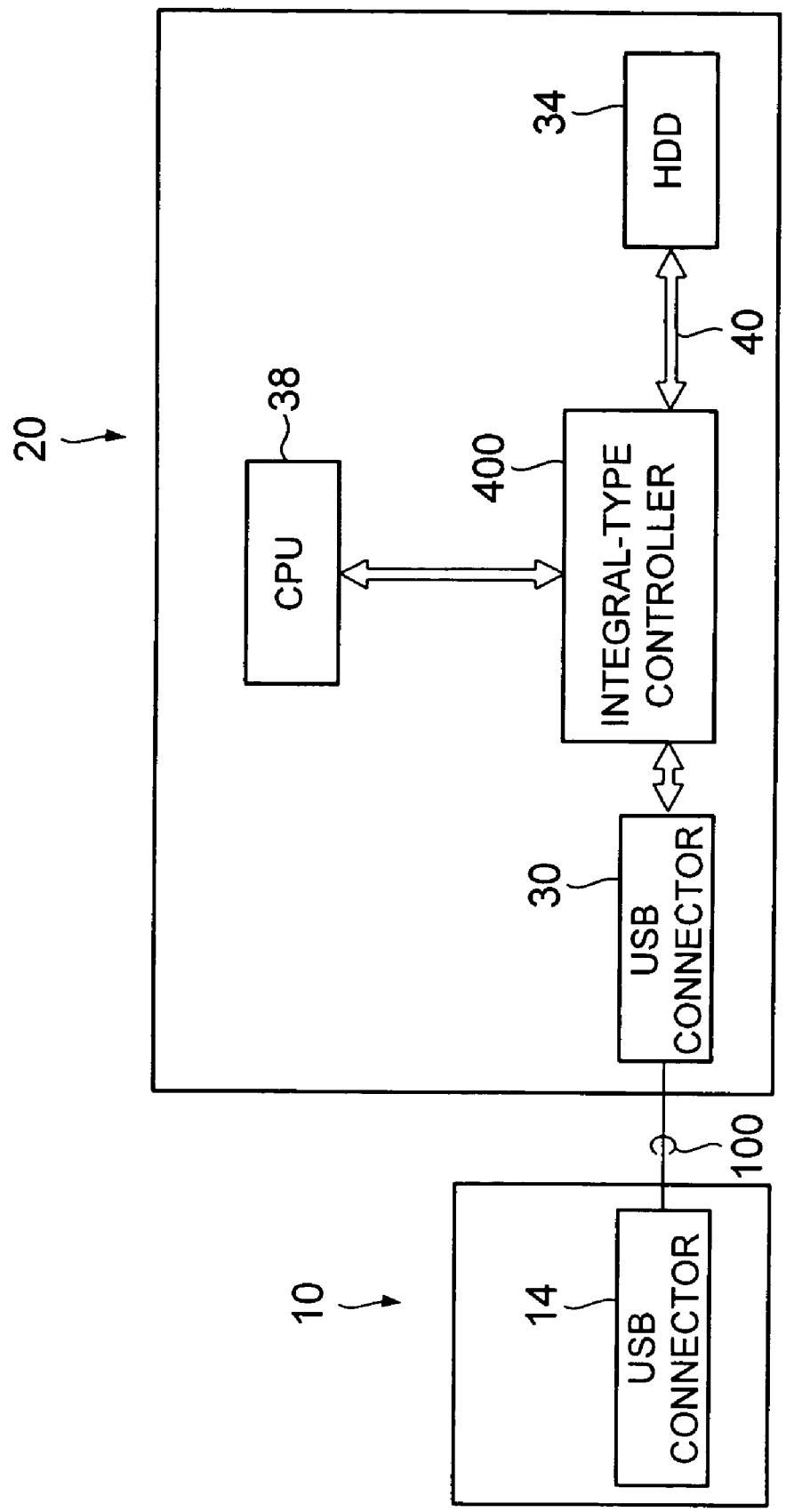
FIG. 19 is a block diagram showing an example of the configuration of an information processing system according to a fifth embodiment of the present invention.

FIG. 19 is a block diagram showing the configuration of an information processing system according to this embodiment, and corresponds to FIG. 1 in the aforementioned first embodiment. As shown in FIG. 19, in the information terminal 20 according to this embodiment, an integral-type controller 400 having both a function of the USB controller 32 and a function of the ATA bus controller 36 is provided.

Accordingly, the integral-type controller 400 not only controls USB communication but also switches the route of the hard disk drive connection bus 40. More specifically, the integral-type controller 400 sets a bus connection from the USB connector 30 to high impedance when the CPU 38 is connected to the hard disk drive connection bus 40, and contrary to this, it sets a bus connection from the CPU 38 to high impedance when the USB connector is connected to the hard disk drive connection bus 40.

The other configuration is the same as that in the aforementioned first embodiment.

As described above, by constituting the USB controller 32 and the ATA bus controller 36 by the integral-type controller 400 composed of one IC, the number of ICs in the information terminal 20 can be reduced.

Incidentally, as in this embodiment, the controllers for communication 122, 222, and 322 in the aforementioned second embodiment to fourth embodiment and the ATA bus controller 36 can also be constituted by one IC.

It should be mentioned that the present invention is not limited to the aforementioned embodiments, and various changes may be made therein. For example, the aforementioned embodiments are described with USB 2.0 and IEEE 1394 as examples of the communication standard between the personal computer 10 and the information terminal 20, but the present invention is also applicable to other communication standards. In this case, an external controller which controls access to the hard disk drive 34 by a request from the outside needs to comply with the respective communication standards.

Moreover, the personal computer 10 is an example of a host terminal, and a digital camera or a digital video camera may be used as the host terminal and connected to the information terminal 20.

Further, in the aforementioned embodiments, the hard disk drive 34 is divided into two areas: the first area 50 from/to which the CPU 38 can read/write data even during data transfer and the second area 52 from which the CPU 38 is limited to read data, but it is not always necessary that the hard disk drive 34 is divided into two areas. Namely, it is also possible that data in the hard disk drive 34 is managed in contention on a file-by-file basis, and the CPU can access files other than a file which the personal computer 10 is accessing. This makes it possible to delete some already-transferred data files during data transfer and thereby secure their corresponding capacities even when the available capacity of the hard disk drive 34 is insufficient.

Furthermore, when the hard disk drive is divided into partitions, the number of partitions is not limited to two, but is any number.

Additionally, the aforementioned hard dirk drive 34 is an example of a data storage, and the data storage may be composed of a different kind of device such as a semiconductor memory, a CD-R/RW drive, a DVD-R/RW, or a DVD-R/RW/RAM.

Moreover, the CPU 38 is an example of an internal controller which accesses the hard disk drive 34 by a request from inside the information terminal 20, and the internal controller may be composed of a different kind of circuit such as a control circuit.

Further, in the aforementioned embodiments, the USB controller 32 and the IEEE 1394 controller 122 which are external controllers are each constituted by hardware, but these external controllers may be realized by software which is executed by the CPU 38.

When each processing explained in the aforementioned embodiments is realized by software, it is possible to record a program to execute each processing on a recording medium such as a flexible disk, a CD-ROM (Compact Disc-Read Only Memory), a ROM, a memory card, or the like and distribute this program in the form of the recording medium. In this case, the aforementioned embodiments can be realized by making the information terminal 20 read the recording medium on which this program is recorded and execute this program.

Furthermore, the information terminal 20 sometimes has other programs such as an operating system, other application programs, and the like. In this case, by using these other programs in the information terminal 20, a command, which calls a program to realize processing equal to that in the aforementioned embodiments out of programs in the information terminal 20, may be recorded on the recording medium.

Moreover, such a program can be distributed not in the form of the recording medium but in the form of a carrier wave via a network. The program transmitted in the form of the carrier wave over the network is incorporated in the information terminal 20, and the aforementioned embodiments can be realized by executing this program.

Further, when being recorded on the recording medium or transmitted as the carrier wave over the network, the program is sometimes encrypted or compressed. In this case, the information terminal 20 which has read the program from the recording medium or the carrier wave needs to execute the program after decrypting or expanding the program.

What is claimed is:

1. An information terminal comprising:
a data storage in which data is stored;
an internal controller which accesses the data storage by a request from inside the information terminal; and
an external controller which accesses the data storage by a request from outside the information terminal, wherein, if a request that the internal controller access the data storage is generated while the external controller is accessing the data storage, then the external controller repeatedly transmits a negative reply that data has not been properly received in response to access from the outside and the internal controller accesses the data storage while the external controller repeatedly transmits the negative reply.

2. The information terminal according to claim 1, wherein when the request that the internal controller access the data storage is generated while the external controller is accessing the data storage,
the internal controller transmits a shift instruction to shift to an interrupt state to the external controller, and the external controller which has received the shift instruction repeatedly transmits the negative reply that data has not been properly received in response to access from the outside.

3. The information terminal according to claim 2, wherein the external controller which has received the shift instruction electrically disconnects a bus connected to the data storage from the external controller.

4. The information terminal according to claim 3, wherein when the request that the internal controller access the data storage is generated while the external controller is accessing the data storage and then the internal controller has finished accessing the data storage, the internal controller transmits a release instruction to release the interrupt state to the external controller, and the external controller which has received the release instruction returns to normal processing with respect to access from the outside.

5. The information terminal according to claim 4, wherein the external controller which has received the release instruction acquires an electrical connection to the bus.

6. The information terminal according to claim 3, further comprising a bus controller provided between the internal controller and the data storage and connected to the data storage via the bus shared with the external controller, wherein when the request that the internal controller access the data storage is generated while the external controller is accessing the data storage, the internal controller instructs the bus controller to acquire an electrical connection to the bus.

7. The information terminal according to claim 6, wherein when the request that the internal controller access the data storage is generated while the external controller is accessing the data storage and then the internal controller has finished accessing the data storage, the internal controller instructs the bus controller to electrically cut off the connection to the bus.

8. The information terminal according to claim 1, wherein the external controller is in an integral-type controller, and the integral-type controller has a function of a bus controller, the internal controller is electrically connected to a bus to the data storage via the bus controller, and when the request that the internal controller access the data storage is generated while the external controller is accessing the data storage, the internal controller instructs the integral-type controller to acquire an electrical connection to the bus.

9. The information terminal according to claim 8, wherein when the request that the internal controller access the data storage is generated while the external controller is accessing the data storage and the internal controller has finished accessing the data storage, the internal controller instructs the integral-type controller to electrically cut off the connection to the bus.

10. A control method of an information terminal including a data storage in which data is stored, an internal controller which accesses the data storage by a request from inside the information terminal, and an external controller which accesses the data storage by a request from outside the information terminal, the control method comprising the steps of:

when a request that the internal controller access the data storage is generated while the external controller is accessing the data storage, repeatedly transmitting, from the external controller, a negative reply that data has not been properly received in response to access from the outside, and allowing the internal controller to access the data storage while the negative reply is repeatedly transmitted.

11. An information processing system including an information terminal and a host terminal connected to the information terminal, wherein the information terminal comprises:

a data storage in which data is stored;

an internal controller which accesses the data storage by a request from inside the information terminal; and an external controller which accesses the data storage by a request from outside the information terminal, and if a request that the internal controller access the data storage is generated while the external controller is accessing the data storage, then the external controller repeatedly transmits a negative reply that data has not been properly received in response to access from the outside and the host terminal which has received the negative reply repeatedly transmits the same data, and the internal controller accesses the data storage while the external controller repeatedly transmits the negative reply.

12. A control method of an information processing system including an information terminal and a host terminal connected to the information terminal, wherein the information terminal comprises:

a data storage in which data is stored an internal controller which accesses the data storage by a request from inside the information terminal; and an external controller which accesses the data storage by a request from outside the information terminal, and the control method comprises the steps of:

when a request that the internal controller access the data storage is generated while the external controller is accessing the data storage, repeatedly transmitting, from the external controller, a negative reply that data has not been properly received in response to access from the outside, making the host terminal which has received the negative reply to repeatedly transmit the same data, and allowing the internal controller to access the data storage while the negative reply is repeatedly transmitted.

* * * * *